JUKE BOX AND TELEVISION RECEIVER CONTROL DEVICE

Filed April 19, 1949 4 Sheets-Sheet 1

INVENTOR.
David J. Peters
BY
Green, McCallister & Miller
HIS ATTORNEYS

Aug. 28, 1951 D. J. PETERS 2,565,881

JUKE BOX AND TELEVISION RECEIVER CONTROL DEVICE

Filed April 19, 1949 4 Sheets-Sheet 2

INVENTOR.
David J. Peters
BY
Green, McCallister & Miller
HIS ATTORNEYS

JUKE BOX AND TELEVISION RECEIVER CONTROL DEVICE

Filed April 19, 1949 4 Sheets-Sheet 3

INVENTOR.
David J. Peters
BY
Green, McCallister & Miller
HIS ATTORNEYS

INVENTOR.
David J. Peters
BY
Green, McCallister & Miller
HIS ATTORNEYS

Patented Aug. 28, 1951 2,565,881

UNITED STATES PATENT OFFICE 2,565,881

JUKE BOX AND TELEVISION RECEIVER CONTROL DEVICE

David J. Peters, Castle Shannon, Pa.

Application April 19, 1949, Serial No. 88,376

6 Claims. (Cl. 178—5.8)

This invention relates to the conjoint control of a television receiver and an automatic phonograph of the juke box type having a number of records arranged in a stack.

These automatic phonographs or juke boxes as they are commonly called are largely controlled from so-called wall boxes which are remote from the phonograph. These wall boxes are coin released devices by means of which the records within the stack are selected.

One object of this invention is to provide means by which the turning on and off of a television receiver can be controlled from any of the coin receiving record selectors of an automatic phonograph of the juke box type.

Another object is to produce means whereby a record included in the stack of records in a juke box and having a spiral groove terminating in a trip or run-out groove can be utilized in the timing of the playing period of a television receiver operated from any of the coin released record selectors of such juke box.

Another object is to produce means operating in conjunction with a record from the stack of records in a juke box for determining the playing period of a television receiver for each proper coin deposited in any of the coin released record selectors of such juke box by playing such record with the amplifier cut off and then halting such record in its movement from playing position to rest position within the stack for a predetermined period of time.

Another object is to produce means operating in conjunction with a record from the stack of records in a juke box for determining the playing period of a television receiver for each proper coin deposited in any of the coin released record selectors of such juke box by halting such record in its movement from playing position to rest position within the stack for a predetermined period of time.

A further object of this invention is to provide a method of timing the playing time period of a television receiver by the playing of a record from the stack of records within a juke box, with the sound system of the juke box cut off during the operation of such record.

Another object is to produce means whereby the selection of records from the stack within a juke box and the turning on and off of a television receiver can be controlled by any one of the record selectors of a juke box without one interfering with the other.

These and other objects I attain by the devices described in the specification and more or less diagrammatically illustrated in the drawings accompanying and forming part of this application.

Figure 1:
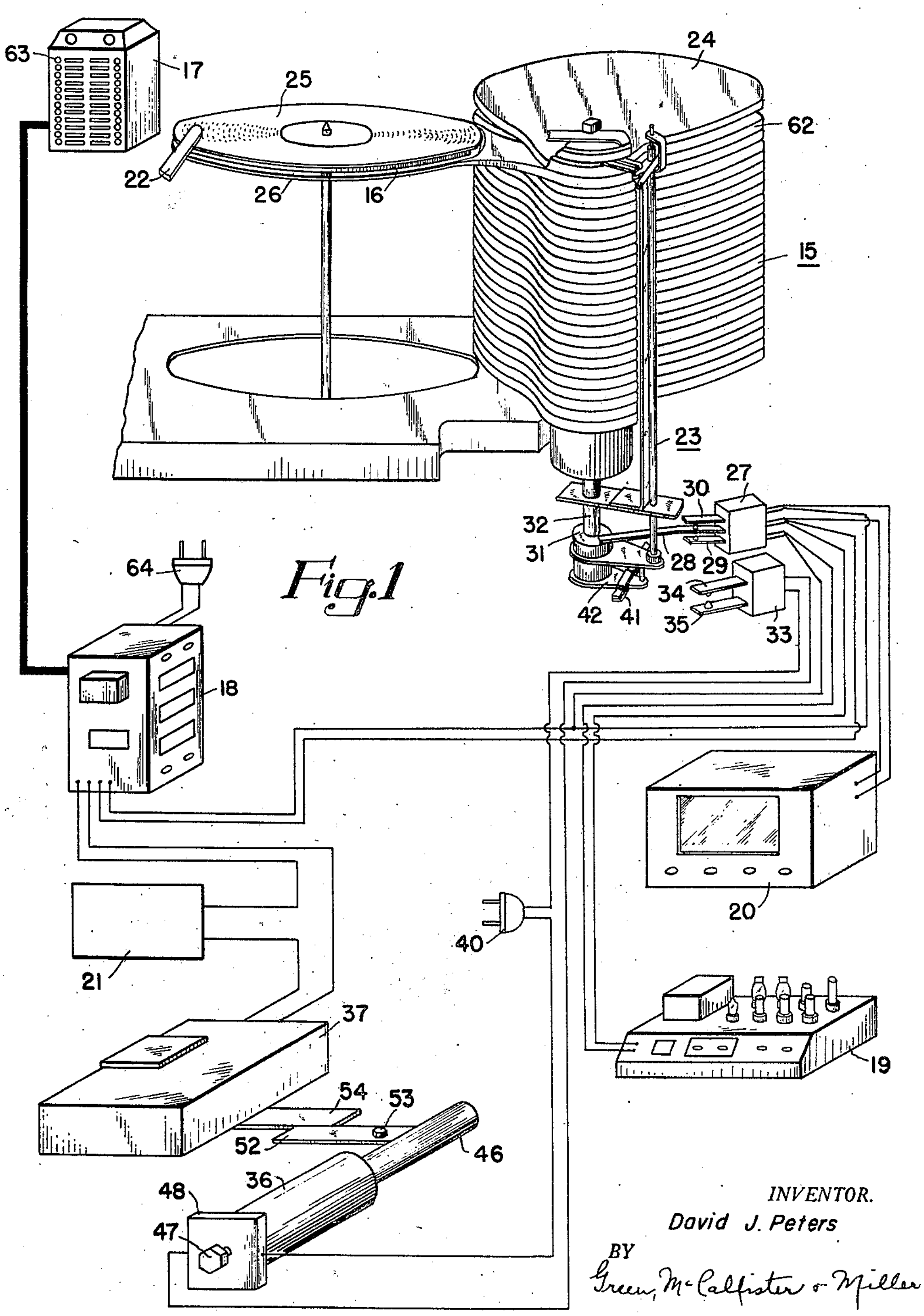
Figure 1 is a diagrammatic illustration of certain elements entering into the make-up of an automatic phonograph of the juke box type, a wall box or record selector, a television receiver, and means for operating the television receiver from such record selector.

The device of this invention comprises mechanism by which the operation of an automatic phonograph of the juke box type, and the turning on and off of a television receiver can be controlled from any of the coin released record selector devices by which the juke box itself is remotely controlled.

In such automatic phonographs, the records are supported in horizontal trays arranged in a stack. The records are movable one at a time from rest position within the stack to playing position above the turntable and then back to the stack. Movement of the records from the stack to playing position is controlled by the coin released record selector devices.

Starting the juke box on the playing of any one of the records within the stack is accomplished by inserting a coin into the coin slot of one of the record selector devices and operating the selector key or button opposite the title of the chosen record.

These record selector devices are either part of the juke box itself or are located at stations or positions remote from the juke box, and each comprises at least one coin slot and a series of selector keys or buttons; one such key or button being employed for each record within the stack.

Wurlitzer phonograph model 1100 is a typical example of an automatic phonograph of the juke box type such as here contemplated. Such phonograph is illustrated and described in more or less detail in The Rudolph Wurlitzer Company's book entitled "Service Instruction Parts Catalog Part No. 298-S."

Each such phonograph, beside having a stack of record trays mounted for swinging movement to and from such stack and each carrying a phonograph record, has a turntable, a tone arm and its needle, and a tray takeout mechanism arranged to swing one tray at a time (the tray of the selected record) from rest position within the stack to position above such turntable and then, when the needle of such tone arm reaches the end of the trip or runout groove of such record, to swing such tray back to rest position within the stack. Operation of the tray takeout mechanism is indirectly controlled from the coin released record selectors.

Such a phonograph also includes an amplifier and a junction box from which current is derived for the phonograph motor, the selector drum, the stepper, the sound system and other elements entering into the make-up of the phonograph or juke box.

In carrying out the conjoint control of a television receiver and such an automatic phonograph or juke box, I utilize one of the trays of the stack, the record carried by such tray, the tone arm and its needle and the tray takeout mechanism as part of the means for determining the length of each playing period of the television receiver. Part at least of the playing time of the television receiver, therefore, depends upon the length of the record groove and since this record (the record selected for the television control) is played silently, that is, with the amplifier cut off, it can have a plain, smooth groove which can extend nearly to the end of the trip or runout groove if desired in order to lengthen the playing time of the television receiver.

Since the movement of any tray toward the stack after its record has been played does not begin until the needle of the tone arm reaches the end of the trip or runout groove of such record, the record selected as the television control record becomes a vital part of the mechanism for controlling the playing time period of the television receiver. This record as above pointed out can either be an ordinary phonograph record such as used in the stack or a special record with a plain smooth groove of the same or greater length than that of the ordinary record, as long as it has a trip or runout groove for moving the tone arm to the center of the record.

The record, of whichever type, used in the timing of the television receiver playing period is played silently since the amplifier is turned off during such playing. Movement of the record tray from rest position in the stack, or movement of part of the mechanism associated with such tray movement is utilized in the operation of a switch for turning off the amplifier and turning on the television receiver.

In cases where it is desired to prolong the playing period of the television receiver for a materially longer time than it takes the needle of the tone arm to traverse the groove of the record, instead of using a special record with an abnormally longer groove, I prefer to stop the record tray on its way back to rest position within the stack, and I do this by cutting off the current to the phonograph motor for a certain period of time. When this period of time expires, the current to the phonograph motor is again turned on and the record tray proceeds on its way to rest position within the stack.

Since the invention of this application does not change or modify the operation of any of the parts entering into the make-up of the automatic phonograph or juke box, only portions of such mechanism are referred to or illustrated. The parts that are referred to as well as the television receiver are merely shown diagrammatically.

The stack of trays with the records therein is numbered 15, the turntable 16, the coin released record selector (wall box) 17, the junction box 18, the amplifier 19, the television receiver 20, the phonograph motor 21, the tone arm 22 and the record takeout mechanism is numbered 23 as an entirety.

For the television receiver playing time control record, I prefer to utilize the topmost record in the stack which is immediately below the stack cover 24 and as above pointed out, such record can be a regular phonograph record such as the others in the stack or it can be a special record with a plain, smooth groove of any length, short or abnormally long, but must terminate in a trip or runout groove.

Since it is desirable to be able to control the duration of the playing time period of the television receiver to suit different conditions, I prefer to use an ordinary phonograph record as the control record and to interrupt travel of the tray of such record from playing position back to rest position within the stack, and to provide means by which the duration of such interruption can be varied or adjusted.

Movement of the record trays from rest position within the stack to position above the turntable is accomplished by the record tray takeout mechanism. This position above the turntable becomes playing position when the turntable in its upward movement through the record tray picks up the record and raises it to playing position as shown in Fig. 1 where record 25 has been lifted from its tray 26 by turntable 16. Movement of the tray takeout mechanism 23 for returning a tray and its record to rest position within the stack is initiated when the needle of the tone arm reaches the end of the trip or run-out groove of the record, causing the tone arm to move to the center of the record.

In the preferred embodiment of my invention, I provide a switch device which is operated to cut off the amplifier 19 and turn on the television receiver 20 when the record tray takeout mechanism 23 reaches the position for taking out tray 26 of record 25, the topmost record of the stack. Such switch device is numbered 27 and is provided with a center prong 28 and side prongs 29 and 30. These prongs are provided with terminal members as disclosed in Figs. 3 and 4 and normally center prong 28 contacts with side prong 29, the amplifier side prong, so that the amplifier is normally turned on when the motor of the phonograph or juke box is running.

Figures 2, 3, 4:
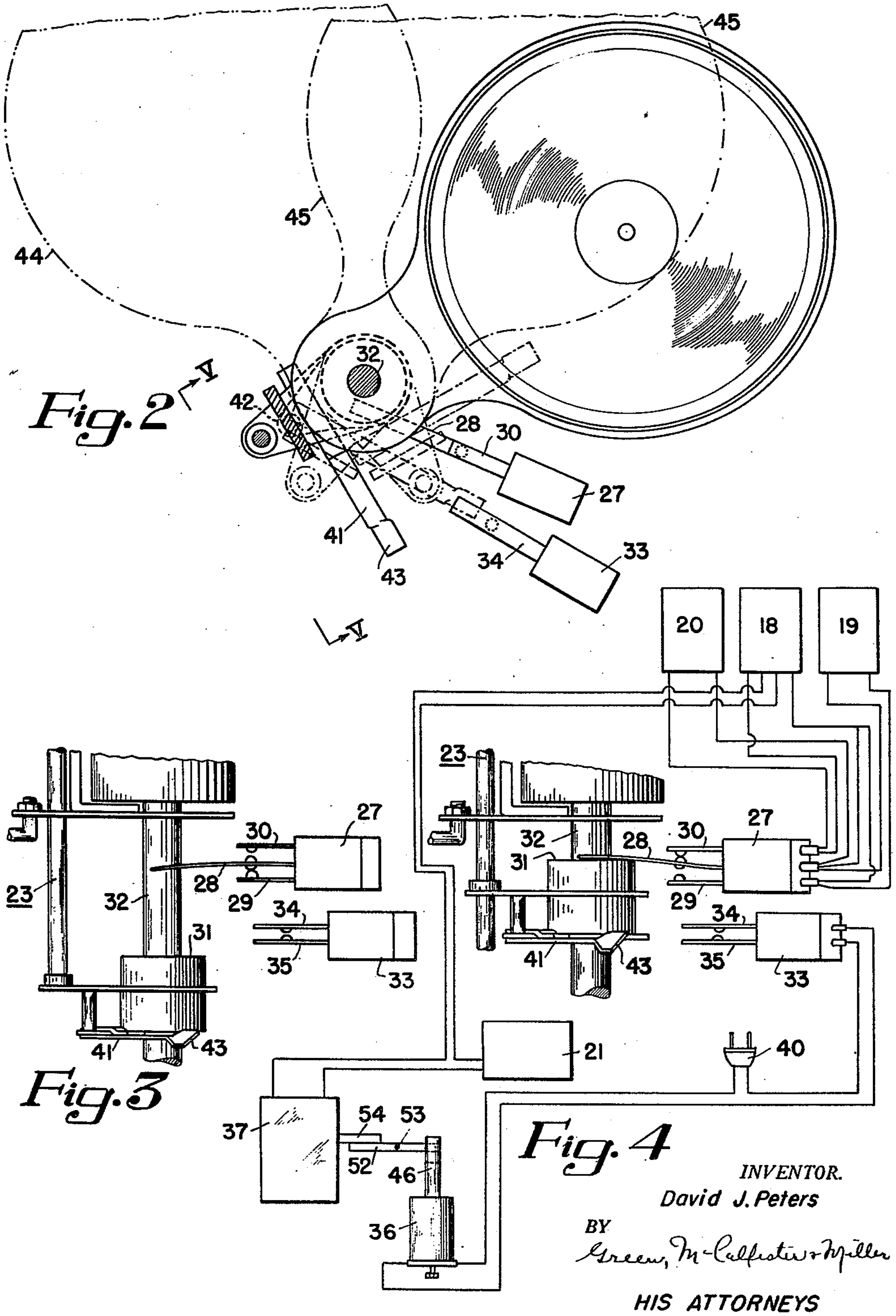
Fig. 2 is a fragmentary top plan view of the stack of records of Fig. 1 with the cover removed. This figure, by dot and dash lines, indicates the position of one of the stack records when in playing position and that it is halted in its movement from playing position back to rest position within the stack.
Fig. 3 is a fragmentary view and illustrates part of the record tray takeout mechanism of Fig. 1 and two of the switch devices entering into the make-up of the control mechanism of this invention.
Fig. 4 is a view similar to Fig. 3 and shows the record takeout mechanism in operative position with relation to the switch devices of Fig. 3; one such switch device being used to cut off the amplifier and cut in the television receiver and the other to cut off current to the phonograph motor and halt the record in its movement from playing position to rest position within the stack.
Figures 5, 7:
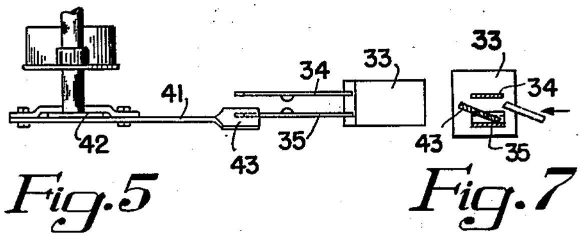
Fig. 5 is a fragmentary side elevational view on a reduced scale of the pronged switch device of Figs. 3 and 4 and its operating means.
Fig. 7 is a sectional view taken on line VII—VII of Fig. 6 and depicts the prong separating movement of the operating blade.
Figure 6:
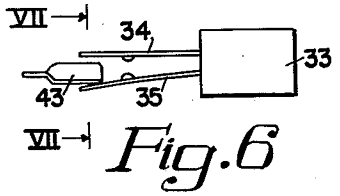
Fig. 6 is an enlarged view of the switch device parts of Fig. 5 and its operating blade.

Center prong 28 projects beyond the side prongs and into the path of movement of part 31 of the tray takeout mechanism so that when such part in moving up from the position shown in Fig. 3 reaches the position shown in Fig. 4, prong 28 is separated from prong 29, and contacts with side prong 30, thus disconnecting the amplifier and connecting or turning on television receiver 20. Since the top surface of part 31 of the tray takeout mechanism is smooth and flat, contact prong 28 will remain in contact with television prong 30 and out of contact with amplifier prong 29 as long as part 31 remains in the position shown in Fig. 4. This position represents the upper limit of travel of part 31 and therefore the upper limit of the tray takeout mechanism which includes part 31.

Tray takeout mechanism 23 is swung about vertical support post 32 and is moved up and down along such post in order to be in position to take out the different trays constituting stack 15.

Figure 12:
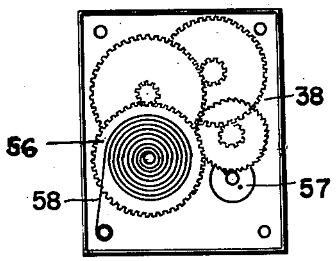
Figs. 10, 11 and 12 are more or less diagrammatic views of a clock operated timing device for determining the length of time the phonograph motor is cut off and the record thus halted during its travel from playing position to rest position within the stack.
Figure 9:
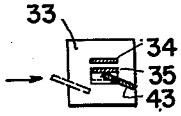
Fig. 9 is a sectional view taken on line IX—IX of Fig. 8 and illustrates the closing of the switch device.
Figure 8:
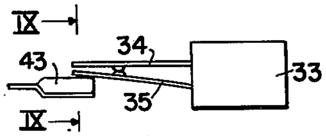
Fig. 8 is a view similar to Fig. 6 but shows the switch device closed by movement of the operating blade depicted in Fig. 9.

In order to interrupt or stop travel of tray 26 with its record 25 during its travel from playing position (the position of Fig. 1) back to rest position within the stack, I utilize a switch device 33. This switch device comprises two normally separated prongs 34 and 35 which are located in the circuit of a solenoid 36 (Figs. 1, 10 and 11) used to actuate a timing device 37 (Figs. 1 and 4) which is here shown as a spring operated clock mechanism 38 (Figs. 10, 11 and 12) arranged to open a normally closed switch 39 (Figs. 10 and 11) located in the circuit of the motor 21 of the phonograph or juke box, stopping operation of such motor and therefore the tray takeout mechanism, until such clock mechanism runs down, again cutting in such motor; tray 26 and record 25 then completing their travel from playing position to rest position within the stack.

Solenoid 36 under the control of switch device 33 is plugged into an A. C. power circuit by means of terminal plug 40. Switch device 33 is operated by a blade-like agent 41 which is preferably bolted to and carried by part 42 which moves vertically with part 31 of the tray takeout mechanism and is swung about post 32 during the operation of such takeout mechanism. During movement of a tray from rest position within the the stack to position above the turntable, the tray takeout mechanism is swung counterclockwise and during movement of such tray and record back to rest position within the stack, such mechanism is swung clockwise.

Agent 41 is provided with a prong contact portion 43 which is so bent from the horizontal, that in moving counterclockwise between the prongs, it will depress prong 35, overseparating the prongs. During its clockwise movement, when the tray and its record is traveling back to rest position within the stack, prong contact portion 43 will force prong 35 into contact with prong 34, thus closing the solenoid circuit, and energizing the solenoid.

These movements of agent 41 are depicted in side and end elevation in Figs. 5–9 inclusive and in top plan in Fig. 2. In this view, the outline of the record tray in position above the turntable is shown by dot and dash line 44 and the position at which travel of the tray and record back to rest position is interrupted is indicated by dot and dash line 45.

Solenoid 36 is provided with a movable plunger 46 which has its movement into the solenoid coils limited by a screw 47 which is threaded through the base plate 48 of the solenoid. Plunger 46 at its center has a bore as indicated by dotted line 49 to receive a spring 50 which bears against the inner end of screw 47 and tends to hold plunger 46 away from such screw.

The outer end of plunger 46 is slotted as at 51 to receive the end of a lever 52 which is pivoted at 53 and has its end opposite slot 51 arranged in line with a lever 54 by means of which the spring of the clock mechanism is wound. Lever 54 is secured to the squared end 55 of the shaft which carries gear wheel 56. The balance wheel is numbered 57.

The clock mechanism is such that it is normally run down or unwound. At such time, switch device 39 is closed as shown in Fig. 10 and the circuit of the phonograph motor therefore is also closed so far as switch device 39 is concerned.

When switch device 33 is operated to energize the solenoid and open switch 39, the phonograph motor is stopped and movement of tray 26 and its record 25 from playing position to rest position within the stack is interrupted and such interruption continues until the clock mechanism runs down and switch 39 is again closed.

As soon as switch device 33 is closed, the solenoid through levers 52 and 54 winds the clock mechanism. The operation of switch device 33 is substantially instantaneous and spring 50 immediately restores the solenoid plunger 46 and lever 52 to the position shown in Fig. 10, leaving lever 54 in the position shown in Fig. 11. Screw 47 is used as an adjustment screw for limiting the inward movement of the solenoid plunger and by limiting the movement of the spring winding lever 54 it controls the degree to which spring 58 is wound.

Figures 10, 11:
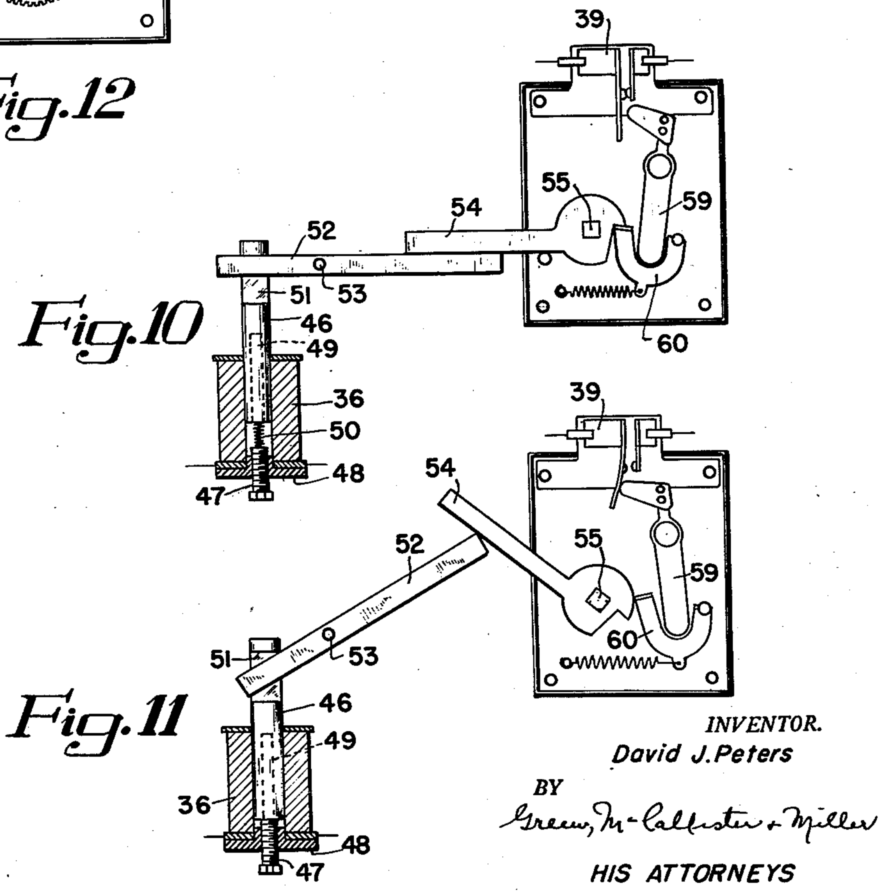

With the winding of spring 58, switch 39 in the motor circuit is opened by lever 59 as shown in Fig. 11; lever 59 being held in switch opening position by actuating lever 60 as will be understood from Figs. 10 and 11.

Figs. 13–16 inclusive of the drawings schematically depict a modification of the method and means heretofore described for conjointly controlling a television receiver and an automatic phonograph or juke box from the coin released record selector on the phonograph or from any of those (wall boxes) remote from such phonograph.

Figure 13:
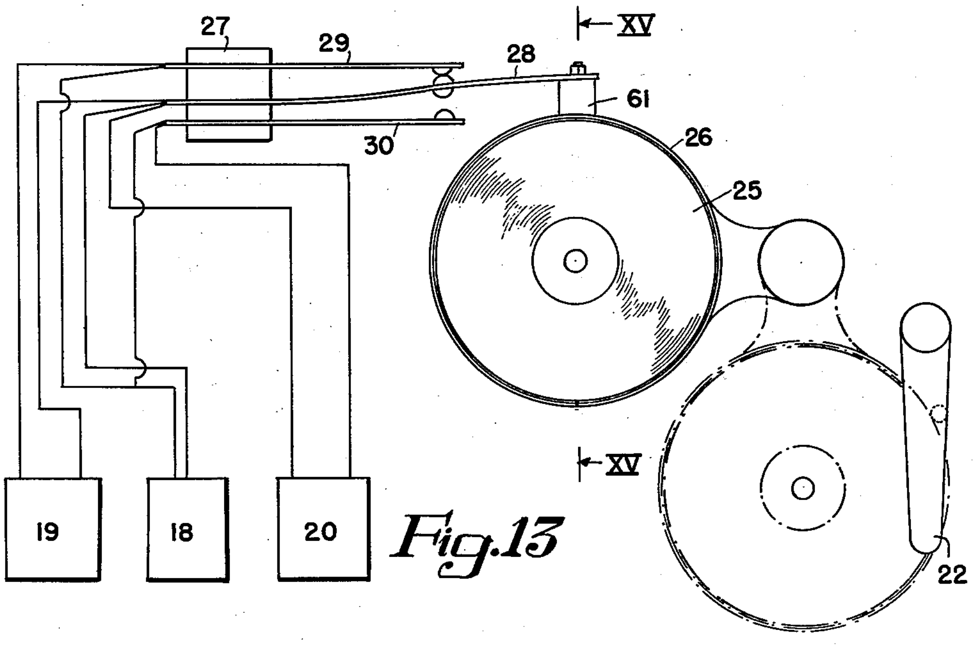
Fig. 13 is a diagrammatic illustration of another way of carrying out part at least of my invention. In this figure, the amplifier circuit is shown closed and the television circuit is shown open.
Figures 14, 15, 16:
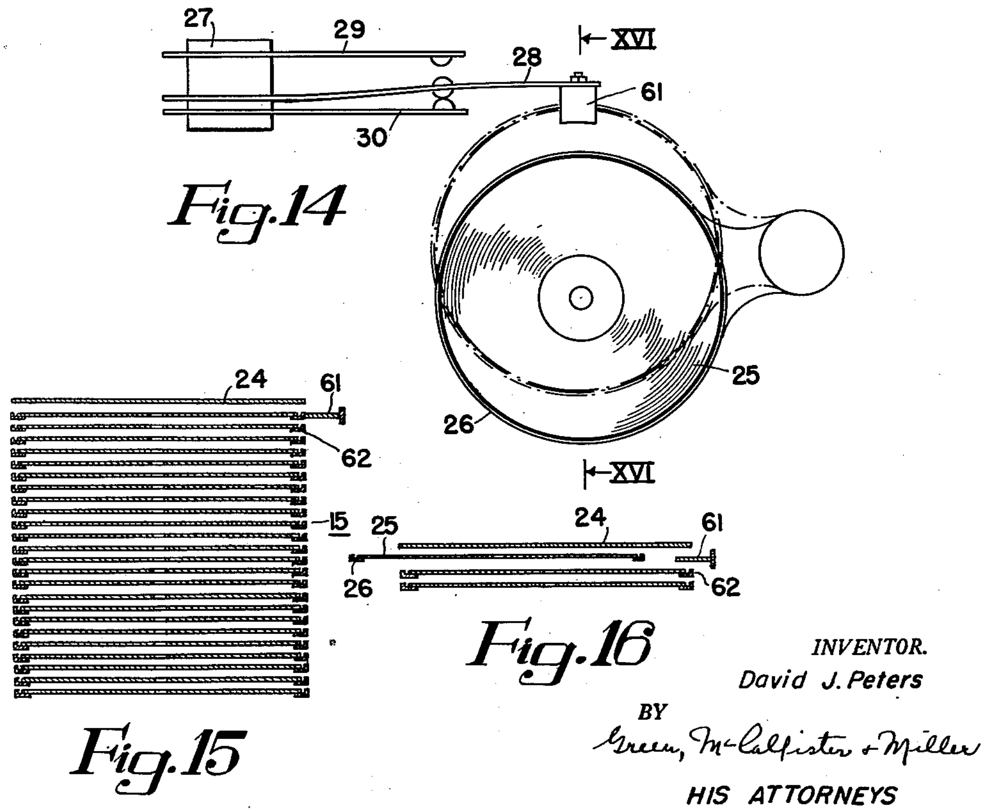
Fig. 14 is a view of a fragmentary portion of Fig. 13 and shows the amplifier circuit open and the television receiver circuit closed.
Fig. 15 is a sectional view taken on line XV—XV of Fig. 13.
Fig. 16 is a sectional view taken on line XVI—XVI of Fig. 14.

In Fig. 13, record 25 with tray 26 is assumed to be the top record of the stack shown in Figs. 1 and 15 with cover 24 removed.

Here switch device 27, instead of being operated by a part such as part 31 of the tray takeout mechanism, is operated by one of the trays, and its record included in stack 15, preferably the topmost tray. Center prong 28 of switch 27 carries a relatively thin tray contact member 61. Switch 27 is so supported from some suitable part of the juke box chassis that prong 28 is normally held in contact with amplifier prong 29 by tray 26 when such tray is in rest position within the stack as shown in Figs. 13 and 15. In Fig. 13, contact member 61 is shown contacting with that portion of the peripheral edge of tray 26 which travels the greatest distance when moving from rest position within the stack (the position shown in full lines in this view) to position above the turntable, which position is shown by dot and dash lines.

Contact member 61 is blade-like as shown in Figs. 15 and 16 and therefore can move in between cover 24 of the stack and the second record tray 62 when tray 26 is being moved from rest position in the stack to position (Figs. 14 and 16) above the turntable. That is, center prong 28 is normally held in contact with amplifier prong 29 by tray 26 when such tray is in rest position within the stack, but when such tray is moved out of rest position, prong 28 follows the tray and moves into contact with television side prong 30. This is possible because of the blade-like character of contact member 61 (Figs. 15 and 16).

In Fig. 14, tray 26 is moving from rest position (shown by dot and dash lines) to position above the turntable. With this arrangement, as soon as the topmost tray 26 moves a sufficient distance on its way to position above the turntable to permit center prong 28 to assume normal position, such prong breaks contact with the amplifier side prong 29 and makes contact with side prong 30, thus turning on or connecting the television receiver. With this construction, the television receiver will remain connected or turned on until tray 26 again reaches rest position within the stack and moves center prong 28 out of contact with the television side prong 30.

If record 25 is a standard record, such as now used in juke boxes with the turntable rotating at about 78 R. P. M., the playing time period of the television receiver will correspond to the playing time of such record and probably will be too short. As above pointed out, however, a special record having an abnormally long groove may be used as the timer for the television receiver playing time.

It will also be apparent that the travel of tray 26 with its record 25 from position above the turntable to rest position within the stack can be interrupted in the same manner and by the same means employed in connection with the layout of Figs. 1–12 inclusive.

If the scheme depicted in Figs. 13–16 inclusive is utilized as the sole means for timing the television receiver playing time period, there will be an interruption in the operation of such receiver each time the record reaches rest position within the stack, even if a proper coin is deposited before the television time expires, because the record tray 26 in moving into rest position disconnects prong 28 from television prong 30. This scheme, therefore, is not as flexible and therefore not as satisfactory as the scheme depicted in Figs. 1–12 inclusive, even if a record is used having a groove of such length as to provide a television receiver playing time period of the desired length, for the reason that if it is desired to prolong the period of depositing one or more coins of the proper denomination, there will still be interruptions between the playing time periods.

This is so because the construction of most automatic phonographs of the juke box type is such that if, during the playing of any certain record, another proper coin is deposited, the playing of such record will be repeated as long as another proper coin is deposited before the end of each playing period. At the end of the first and each succeeding playing period, however, such record and its tray will be swung back to rest position within the stack and then out to position above the turntable before repetition of the playing of such record begins.

During these movements of the tray to and from rest position, part 31 of the tray takeout mechanism (the instrumentalities by which the trays and records are moved from and to rest position within the stack) remains in the position to which it was raised in response to the first operation of the key of the coin released record selector device (wall box).

If the topmost record, the one used for timing the television reception period, is selected, part 31 will be raised to the upper limit of its travel in response to the first operation of key 63 of any wall box and will remain at such limit with the television receiver turned on as long as a coin is deposited before the end of each silent playing of such topmost record 25. It will be apparent, therefore, that the method and means depicted in Figs. 1–12 inclusive is preferred.

The terminal plug for the junction box is numbered 64 and since junction box 18 will probably not be provided with a receptacle that can be used for terminal plug 40, this plug is adapted to be connected to any suitable A. C. outlet.

This application is a continuation in part of my copending application Serial No. 76,973, filed February 17, 1949, now abandoned.

What I claim is:

1. In combination, an automatic phonograph having a turntable, a tone arm equipped with a needle, a sound amplifier, a stack of record trays mounted for movement to and from playing position above such turntable, phonograph records in such trays, instrumentalities for moving one such tray at a time from rest position within such stack to playing position and then, when the needle of such tone arm reaches the end of the trip or run-out groove of such record, moving such tray and record back to rest position within the stack, a television receiver, a coin released record selecting device having a selector key associated with each such record and governing the operation of such instrumentalities in moving the selected record and its tray from the stack to and from playing position, means identifying one such key with such television receiver, means responsive to the operation of such key for disconnecting such amplifier from its source of electric current means operating after such amplifier disconnecting means operates for connecting such television receiver with its source of electric current, and then when the record identified with the television receiver reaches rest position within the stack, for disconnecting such television receiver from its source of electric current and again connecting such amplifier with its source of electric current; the construction and arrangement being such that the television receiver after being turned on or connected with its source of electric current remains on during the playing of such record without amplification and until the time the tray holding such record reaches rest position within the stack.

2. In combination, an automatic phonograph having a turntable, a tone arm equipped with a needle, an amplifier, a stack of record trays mounted for movement to and from playing position above such turntable, phonograph records in such trays, instrumentalities for moving one such tray at a time from rest position within such stack to playing position and then, when the needle of such tone arm reaches the end of the trip or run-out groove of such record, moving such tray and record back to rest position within the stack, a television receiver, a coin released record selecting device having a selector key associated with each such record and governing the operation of such instrumentalities in moving the selected record and its tray from the stack to playing position, means identifying one such key with such television receiver, means, operating in response to movement from rest position in the stack toward playing position of the tray of the record identified with the television receiver, for disconnecting such amplifier from its source of electric current, means operating after such amplifier disconnecting means operates, for connecting such television receiver with its source of electric current and then after such tray and record associated with such television receiver again reach rest position within the stack, in disconnecting the television receiver from its source of electric current and connecting the amplifier with its source of electric current.

3. In combination, an automatic phonograph having a turntable, a tone arm equipped with a needle, an amplifier, a stack of record trays mounted for movement to and from playing position above such turntable, records in such trays, instrumentalities for moving one such tray at a time from rest position within such stack to playing position and then, when the needle of such tone arm reaches the end of the trip or run-out groove of such record, moving such tray and record back to rest position within the stack, a television receiver, a coin released record selecting device having a selector key associated with each such record and governing the operation of such instrumentalities in moving the selected record and its tray from the stack to playing position, means identifying one such key with such television receiver, an element included in such instrumentalities and having a regular path of movement one limit of which is reached as such instrumentalities contact the tray of such record, means operating in response to movement of such element toward such limit to disconnect such amplifier from its source of electric current and means operating after such amplifier disconnecting means operates, to connect the television receiver to its source of electric current and then to disconnect such television receiver and connect such amplifier when such element moves in the opposite direction or away from such limit of its movement.

4. In combination, an automatic phonograph having a turntable, a tone arm equipped with a needle, an amplifier, a stack of record trays mounted for movement to and from playing position above such turntable, phonograph records in such trays, instrumentalities for moving on such tray at a time from rest position withi such stack to playing position and then, when th needle of such tone arm reaches the end of th trip or run-out groove of such record, movin such tray and record back to rest position withi the stack, a television receiver, a coin release record selecting device having a selector key as sociated with each such record and governin the operation of such instrumentalities in movin the selected record and its tray from the stac to playing position, means identifying one suc key with such television receiver, an element in cluded in such instrumentalities and having regular path of movement one limit of which i reached as such instrumentalities are in positio to contact the tray of the record associated wit the television receiver, a switch device havin one terminal connected to the amplifier, anothe terminal connected to the television receiver an a third terminal member connected to a sourc of electric current and being normally in contac with the amplifier terminal and being arrange to be moved out of contact with such amplifie terminal and into contact with the televisio receiver terminal by such element as the sam reaches such limit of its movement and to b moved out of contact with the television receive terminal and back into contact with the ampli fier terminal as such element moves away fro such limit; the construction and arrangemen being such that the television receiver is turne on by operating the selector key of the recor identified with the television receiver and remain on during the playing of such record silently c without amplification and until the tray holdin such record reaches rest position within the stack 5. In combination, an automatic phonograp having a turntable, a tone arm equipped with needle, an amplifier, a stack of record tray mounted for movement to and from playing po sition, phonograph records in such trays, instru mentalities for moving one such tray at a tim from rest position within such stack to playin position above such turntable and then, whe such tone arm needle reaches the end of the tri or run-out groove of the record on such turn table, to move such tray back to rest positio within the stack, a television receiver, a coin re leased record selecting device having a selecto key for each such record, means identifying on such key with such television receiver, means re sponsive to the operation of such key for discon necting the amplifier and connecting the tele vision receiver as such instrumentalities reac position to move the tray of such record fro rest position within the stack to playing positio means operating after such record has bee played silently or without amplification and th needle of such tone arm has reached the end o the trip or run-out groove of such record, for in terrupting the movement of such tray and reco back to rest position within the stack, means fo determining the duration of such interruptio and means for turning off such television receive and turning on such amplifier when such instru mentalities move away from such position.

6. In combination, an automatic phonograp having a turntable, a tone arm equipped with needle, an amplifier, a stack of record tra mounted for movement to and from playing po sition, phonograph records in such trays, instru mentalities for moving one such tray at a tin from rest position within such stack to playir position above such turntable and then, whe such tone arm needle reaches the end of the trip or run-out groove of the record on such turntable, to move such tray back to rest position within the stack, a television receiver, a coin released record selecting device having a selector key for each such record, means identifying one such key with such television receiver, means responsive to the operation of such key for disconnecting the amplifier and connecting the television receiver as such instrumentalities reach position to move the tray of such record from rest position within the stack to playing position, means operating after such record has been played silently or without amplification and the needle of such tone arm has reached the end of the trip or run-out groove of such record, for interrupting the movement of such tray and record back to rest position within the stack, clock operating means for determining the duration of such interruption and means for turning off such television receiver and turning on such amplifier when such instrumentalities move away from such position.

DAVID J. PETERS.

REFERENCES CITED

The following references are of record in the file of this patent:

UNITED STATES PATENTS

| Number | Name | Date |
|---|---|---|
| 2,031,075 | Scheibell | Feb. 15, 1936 |